United States Patent
Scianaro et al.

(10) Patent No.: US 10,183,855 B2
(45) Date of Patent: Jan. 22, 2019

(54) ANTI-THEFT DEVICE FOR A SADDLE

(71) Applicants: Andrea Scianaro, Perugia (IT); Massimo Ghirga, Perugia (IT)

(72) Inventors: Andrea Scianaro, Perugia (IT); Massimo Ghirga, Perugia (IT)

(*) Notice: Subject to any disclaimer, the term of this patent is extended or adjusted under 35 U.S.C. 154(b) by 442 days.

(21) Appl. No.: 14/433,512

(22) PCT Filed: Oct. 4, 2013

(86) PCT No.: PCT/IB2013/002197
§ 371 (c)(1),
(2) Date: Apr. 3, 2015

(87) PCT Pub. No.: WO2014/057330
PCT Pub. Date: Apr. 17, 2014

(65) Prior Publication Data
US 2015/0259190 A1 Sep. 17, 2015

(30) Foreign Application Priority Data

Oct. 8, 2012 (IT) .............................. MI2012A1682
Jul. 12, 2013 (IT) .............................. PG2013A0027

(51) Int. Cl.
*F16B 19/00* (2006.01)
*B68C 1/00* (2006.01)
(Continued)

(52) U.S. Cl.
CPC .................. *B68C 1/00* (2013.01); *B68C 1/02* (2013.01); *F16B 35/00* (2013.01)

(58) Field of Classification Search
CPC .............. B68C 1/00; B68C 1/02; F16B 35/00
(Continued)

(56) References Cited

U.S. PATENT DOCUMENTS 1,352,918 A * 9/1920 Rohbock ................. F16B 39/24
24/569
2,647,432 A * 8/1953 Huck .................. F16B 19/1027
411/339

(Continued)

FOREIGN PATENT DOCUMENTS

GB 2406494 4/2005
WO 2009013396 1/2009

OTHER PUBLICATIONS

International Search Report issued in PCT Application No. PCT/IB2013/002197.
European Search Report corresponding to IT MI2012A001682.

*Primary Examiner* — Gary W Estremsky
(74) *Attorney, Agent, or Firm* — Lucas & Mercanti, LLP

(57) ABSTRACT

Anti-theft device for a saddle having at least one through hole, the device having at least one first fastening member and at least one second fastening member respectively provided with a first countercheck and a second countercheck, coupleable in abutment, from opposite sides of the at least one through hole, to the outer surfaces of the saddle, wherein the at least one first fastening member and/or the at least one second fastening member is/are housable, at least partially, inside the at least one through hole of said saddle, the anti-theft device having means for constraining in a not-removable way the at least one first fastening member to the at least one second fastening member.

9 Claims, 4 Drawing Sheets

(51) Int. Cl.
   *B68C 1/02* (2006.01)
   *F16B 35/00* (2006.01)
(58) Field of Classification Search
   USPC .......... 411/510, 537, 918, 930, 339; 29/508;
   340/572.1, 572.8; 292/327
   See application file for complete search history.

(56) References Cited

U.S. PATENT DOCUMENTS

| | | | | |
|---|---|---|---|---|
| 3,135,154 A * | 6/1964 | Zenzic | ................... | F16B 31/028 411/12 |
| 3,828,653 A * | 8/1974 | Aldinger | .................... | F16J 1/10 91/488 |
| 3,862,775 A * | 1/1975 | Gudmundsen | .......... | E05B 39/02 292/327 |
| 4,830,557 A * | 5/1989 | Harris | ................... | F16B 37/044 411/112 |
| 5,161,838 A * | 11/1992 | Ely | ....................... | F16B 21/186 292/327 |
| 5,347,689 A * | 9/1994 | Georgopoulos | ...... | G09F 3/0317 24/115 M |
| 5,399,052 A * | 3/1995 | Volkmann | ........... | F16B 19/1063 411/43 |
| 5,542,777 A * | 8/1996 | Johnson | ............... | B61D 17/043 403/384 |
| 5,732,989 A * | 3/1998 | Stevenson | ............... | E05B 67/36 292/318 |
| 5,909,176 A * | 6/1999 | Schrott | .............. | G08B 13/2408 340/551 |
| 6,039,365 A * | 3/2000 | Rogatnev | ............ | F16B 37/0857 292/318 |
| 6,550,829 B1 * | 4/2003 | Dobson | ................. | G09F 3/0317 292/327 |
| 7,597,253 B2 * | 10/2009 | Lin | ....................... | G06K 19/073 235/382 |
| 7,686,531 B2 * | 3/2010 | Congdon | ................. | B25G 3/30 16/426 |
| 7,696,886 B2 * | 4/2010 | Lai | ........................ | G09F 3/0317 340/572.1 |
| 7,764,173 B2 * | 7/2010 | Yamagiwa | ............... | B62H 5/20 235/384 |
| 8,026,816 B2 * | 9/2011 | Chao Cheng | ........ | G06K 19/041 292/327 |
| 8,267,003 B1 * | 9/2012 | Lou | ......................... | F41H 5/013 89/36.08 |
| 8,321,124 B2 * | 11/2012 | Curatolo | ............... | G01S 5/0036 340/539.1 |
| 8,486,120 B2 * | 7/2013 | Shimko | ................ | A61C 8/0033 411/55 |
| 8,764,363 B2 * | 7/2014 | Yang | ....................... | F16B 19/08 411/339 |
| 8,939,694 B2 * | 1/2015 | Weiss | ..................... | B60B 3/142 411/147 |
| 8,988,222 B2 * | 3/2015 | Rodgers | ................ | B60R 25/102 340/426.2 |
| 9,472,125 B2 * | 10/2016 | Debrody | ................ | F16B 19/08 |
| 2011/0094275 A1 | 4/2011 | Contarino, Jr. | | |

\* cited by examiner

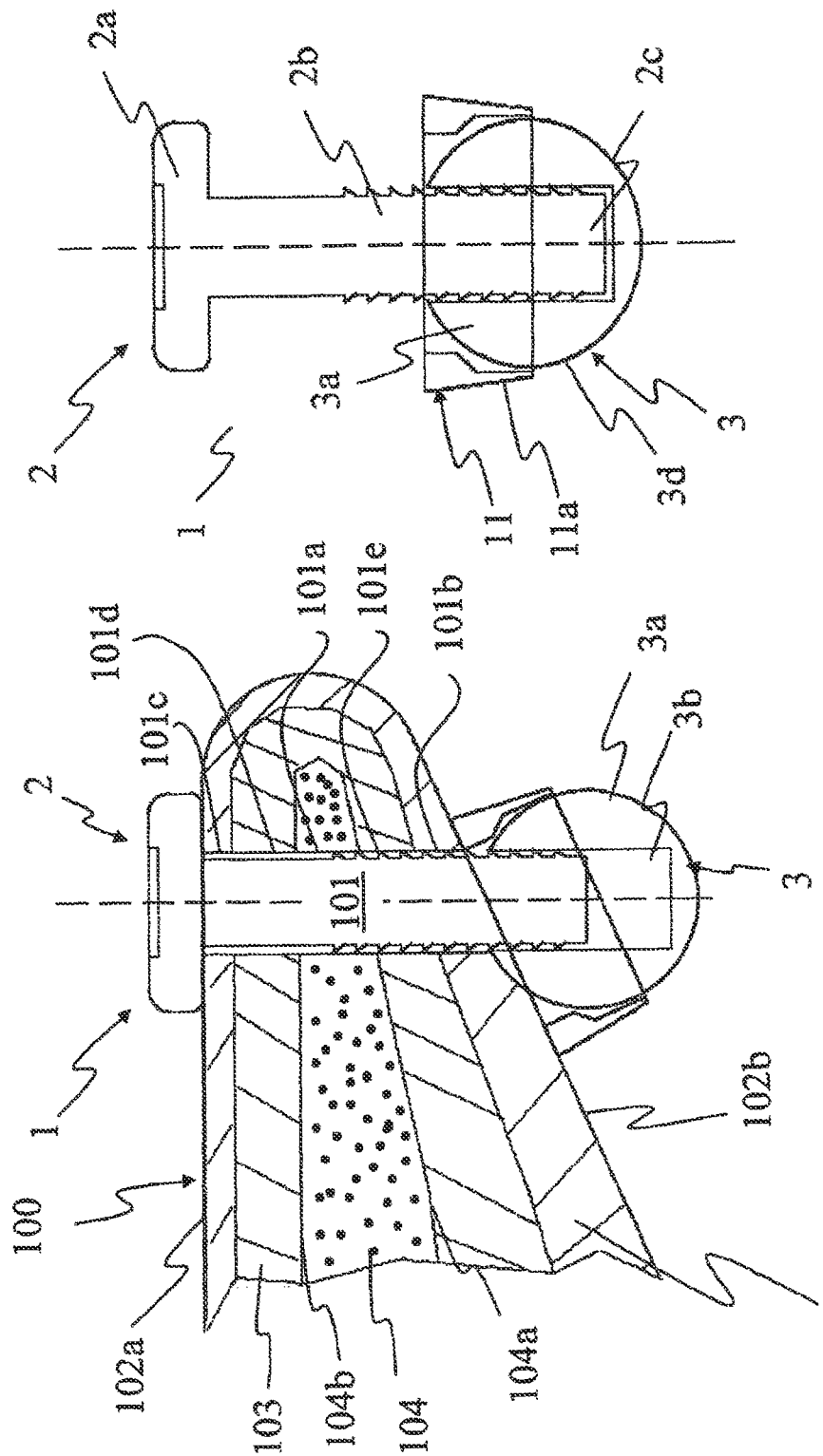

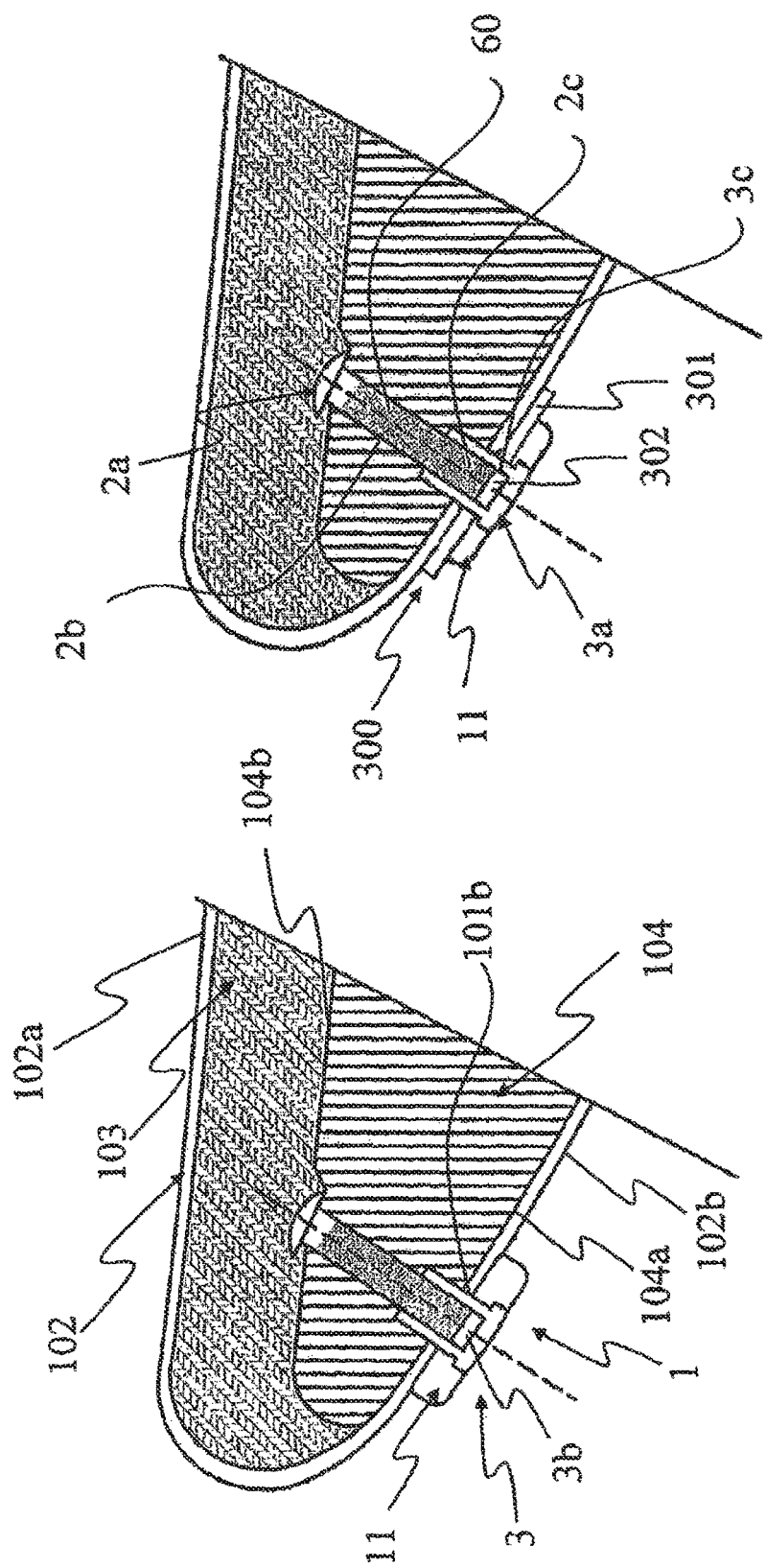

ANTI-THEFT DEVICE FOR A SADDLE

CROSS-REFERENCE TO RELATED APPLICATIONS

This application is a 371 of PCT/IB2013/002197, filed Oct. 4, 2013, which claims the benefit of Italian Patent Application Nos. MI2012A001682, filed Oct. 8, 2012 and PG2013A000027, filed Jul. 12, 2013

FIELD OF THE INVENTION

The present invention relates to an anti-theft device for a saddle and respective anti-theft system. Furthermore, the invention relates to a method for prearranging said anti-theft device on said saddle as well as for prearranging said anti-theft system.

KNOWN PREVIOUS ART

According to known art, nowadays the riding saddles, whose economic value can also be significant, are protected from thefts simply by hot embossing, generally on the outer surface thereof made of leather, or hide, preferably inside the saddle quarter, a particular alphanumeric code distinctive of the sold product. It is known however that such a hot embossing operation is not able to produce any kind of deterrent effect against prowlers since the alphanumeric code embossed on the saddle can be easily scratched and replaced, always by means of hot embossing, with a completely different one, to allow who misappropriate the saddle to market it again. Therefore, the absence of technologies able to prevent, or render disadvantageous, the saddle theft and, at the same time, to make possible the identification of the possibly stolen saddle associating it to the legitimate owner, renders substantially worthless the possible complaint filed by the owner victim of the theft, with the consequence that the probabilities of regaining possession of the her/his own saddle are extremely poor, if not null.

It is therefore object of the present invention to realize an anti-theft device able to be an effective deterrence tool against prowlers and which is, at the same time, structurally easy and of reduced bulk.

Further object of the present invention is to realize an anti-theft system that allows tracing the legitimate owner without having to damage the saddle itself.

Further object is to realize a method which allows prearranging simply and rapidly on any saddle, also already existing or also during the production step, the afore mentioned anti-theft device as well as the respective anti-theft system.

These and other objects are achieved by an anti-theft device for a saddle comprising at least one first layer provided with at least one through hole, or for a saddle having at least one through hole, said device comprising at least one first fastening member and at least one second fastening member respectively provided with a first countercheck and a second countercheck, directly or indirectly, coupleable in abutment, from opposite sides of said at least one through hole, to the outer surfaces of said at least one first pierced layer of said saddle, or to the outer surfaces of said saddle, wherein said at least one first fastening member and/or said at least one second fastening member is/are housable, at least partially, inside said at least one through hole of said at least one first layer, or inside said at least one through hole of said saddle, said anti-theft device comprising, as well, means for constraining in a not-removable way said at least one first fastening member to said at least one second fastening member.

In practice, due to the fact that the two fastening elements are positioned on the saddle, at the hole obtained in one or more of its layers, and constrained one to another in a not-removable way, it is practically impossible removing such a device from the saddle without damaging the saddle itself, with the consequence of rendering it useless or, however, immediately accounting for its shady provenience in case of removal of the device itself.

According to an alternative embodiment of the invention, said at least one first countercheck has a lowered plate shape and said at least one second countercheck has a substantially sphere shape. In this way, the device can be positioned on the saddle without having to take care about the parallelism between the two outer surfaces of the saddle. In fact, the sphere-shaped countercheck element allows orienting the device without any difficulties also on not-flat ending surfaces, as it occurs for example in case of the saddle itself when the device is mounted at the cantle. Furthermore, the fact that the countercheck elements have a lowered flat shape and/or a sphere shape makes the device difficult to grip by pincers or gripping elements in general.

Again, always according to the afore described same embodiment of the invention, said at least one first fastening member is provided, as well, with a pin housable, at least partially, inside said at least one through hole whereas said at least one second fastening member comprises at least one blind hole to accommodate the free end portion of said at least one pin. This prevents anyone from easily cutting the pin since it is hidden to the eyes of the outside observer.

Furthermore, the device comprises at least one protecting ring disposed in abutment between one of the outer surfaces of said saddle and said at least one second fastening element, said at least one second countercheck element being housable, at least partially, inside said at least one protecting ring outside said through hole. Preferably, said at least one protecting ring has a truncated-cone shape and the outer surface of said ring is substantially tangent to the outer surface of said at least one second countercheck, at least when it is housed, at least partially, inside said protecting ring. In this way, the device is practically impossible to grip and/or to cut in any one of its points. In fact, on one side the presence is provided of a first countercheck having a substantially flat shape and, on the other side, of a second countercheck having a sphere shape that is housed in a truncated-cone ring. Substantially, the ring function is to avoid that any portion of the pin of the first fastening element can be visible and, due to its configuration, it also prevents the device from being easily gripped to be cut without damaging the saddle.

Of course the so described anti-theft device can be marked by any chip removal machining method, or by laser or other similar techniques, with any alphanumeric code on the outer surface, visible or not visible to an observer, in such a way that it is possible, in case of removal of the anti-theft device for controlling the actual provenience of the saddle, to trace the actual owner.

Again, always according to the invention, an anti-theft system is provided, comprising at least one anti-theft device according to one or more of claims 1 to 10, and at least one remote identification device insertable into said saddle, through said at least one through hole, and which can be positioned inside said saddle. For example, a remote identification device can comprise a RFID device, i.e. of the type for radio frequency identification. Inside the RFID device, information can be inserted such as alphanumeric codes or the like, such to allow quickly tracing the real owner of the saddle. In fact a database can be provided, able to associate each alphanumeric code inserted in the RFID device with the name of the real owner that can be provided on demand by the owner himself or against presentation of a card issued with the owner itself.

Furthermore, it is also provided a method for prearranging an anti-theft system for saddle according to claim 14, characterized by comprising the step of making a through hole on said saddle, the step of inserting said RFID device, through said through hole, into said saddle, and the step of constraining in a not-removable way said at least one first fastening member to said at least one second fastening member at said through hole, preferably made at the saddle cantle. In particular, the saddle is provided with two or more layers in such a way that said at least one RFID device is inserted into said saddle between two consecutive layers of said two or more layers. More specifically, the saddle is provided with an outer lining layer, preferably made of leather, an intermediate padding layer for absorbing the impacts, preferably realized in foam rubber, and an inner stiff core, made for example of wood or, alternatively, plastic materials; said RFID device is advantageously inserted between the inner and the intermediate lining layers.

Again, in order to achieve the afore mentioned objects, it is provided a method for prearranging an anti-theft device for saddle according to one or more of claims 1 to 10, comprising the steps of making a through hole on said saddle and the step of constraining in a not-removable way said at least one first fastening member to said at least one second fastening member at said through hole, preferably made at the saddle cantle.

Finally, the afore mentioned objects are achieved by an additional method for prearranging an anti-theft device for saddle according to one or more of claims 1 to 13, comprising the step of a) making a through hole on at least one first layer of said at least one saddle having one or more layers, the step of b) housing, at least partially, said at least one first fastening element, or said at least one second fastening element, inside said at least one through hole, in such a way that said at least one first countercheck, or said at least one second countercheck is, directly or indirectly, coupleable in abutment to one of the outer surfaces of said at least one first pierced layer, and the step of c) constraining in a not-removable way said at least one first fastening element to said at least one second fastening element, by said constraining means.

BRIEF DESCRIPTION OF THE DRAWINGS

These and other aspects of the present invention will be more evident to the field technician from the following description of a preferred embodiment of the present invention, provided by way of example and not of limitation, referring to the attached figures, in which:

FIG. 1 shows an anti-theft device according to the invention prearranged as constrained to a saddle shown in section;

FIG. 2 is an assembled view of the anti-theft device of FIG. 1;

FIG. 7 is a view of a further embodiment of anti-theft device according to the invention;

FIG. 8 is a view of a further embodiment of anti-theft device comprising GPS localizing means.

DETAILED DESCRIPTION OF SOME EMBODIMENTS OF THE PRESENT INVENTION

Figure 4:
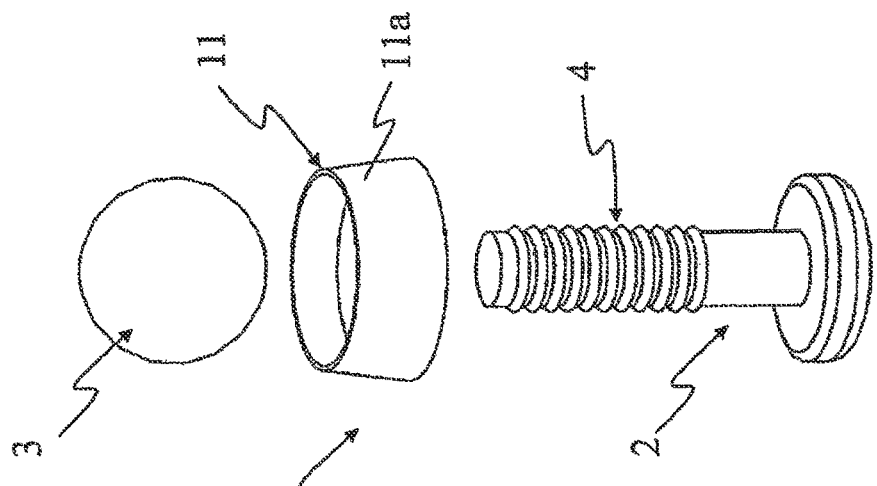
FIG. 4 is an axonometric exploded view of the device of FIG. 1.
Figure 3A:
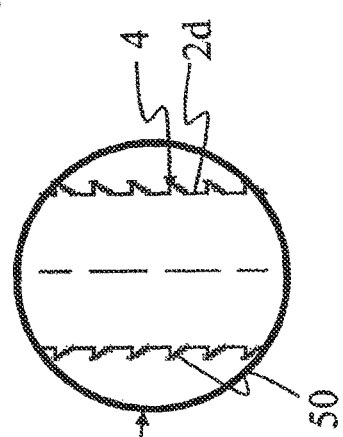
FIG. 3a is a particular view of the anti-theft device of FIG. 3.
Figure 3:
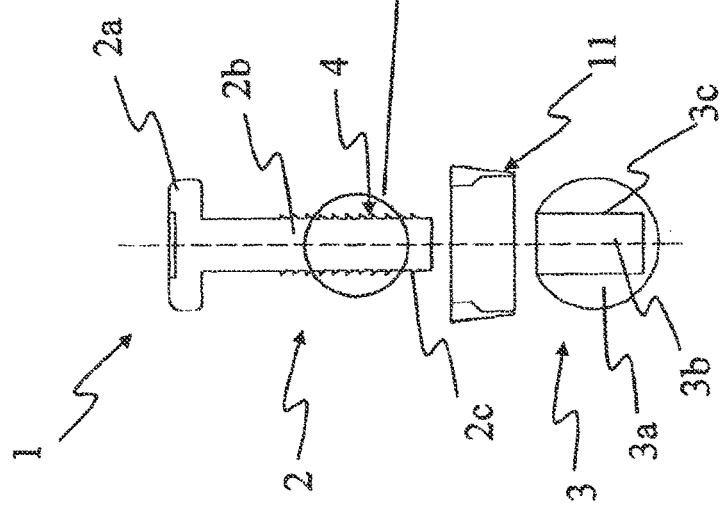
FIG. 3 is an exploded view of the anti-theft device of FIG. 1.

With particular reference to these Figures, an anti-theft device according to the invention is referred to by numeral 1.

FIG. 1 shows an anti-theft device 1 for a saddle 100 (only partially visible), made of steel, which can be used for horse riding and having a through hole 101. The saddle 100, in the herein depicted case, is provided with an outer lining layer 102, generally in leather, or hide, an intermediate layer 103 made of padding for absorbing the impacts, generally realized in foam rubber, and an inner stiff core 104, for example made of wood or, alternatively, plastic materials, or metal, or other similar materials. Such layers 102, 103 and 104 have one or more through holes each, in particular the layer 104, having only one through hole 101a, the layer 102 has two through holes 101b and 101c, and the layer 103 two through holes 101d and 101e, in order to form together the afore mentioned through hole 101 for said saddle 100.

The anti-theft device 1 shown in FIGS. 1 to 4 comprises a first fastening element 2 and a second fastening element 3 provided, respectively, with a first countercheck 2a and a second countercheck 3a coupleable in abutment, from opposite sides of said through hole 101, to the outer surfaces 102a, 102b of said saddle 100, lying on the outer lining layer 102. Note that according to the herein described embodiment, the first 2a and the second 3a counterchecks urge in abutment directly on said two outer surfaces 102a, 102b, however a device embodiment can be provided as well wherein the first countercheck 2a and/or the second 3a countercheck is/are not directly in abutment against the outer surface/s 102a, 102b, without thereby departing from the protection scope of the present invention. It has to be noted also that the first countercheck 2a and the second countercheck 3a are in effect coupleable in abutment, from opposite sides of said through hole 101, also to the two outer surfaces 104a and 104b of one 104 of the layers of the saddle 100, although indirectly since spaced apart by the above mentioned layers 102 and 103.

Always according to the herein described embodiment, said first countercheck 2a has a lowered circular plate shape whereas said second countercheck 3a has a substantially sphere shape. Furthermore, said first fastening member 2 is provided, as well, with a pin 2b housable, at least partially, inside said at least one through hole 101 said second fastening member 3 comprises at least one blind hole 3b to accommodate the free end portion 2c of said pin 2b. Note that, in the herein described embodiment, the second countercheck 3 coincides, substantially, with said second fastening element 3.

In any case, although not described herein, an embodiment in which also the second fastening element 3 comprises a pin and has a second countercheck having a lowered flat shape still falls within the protection scope of the present invention, as well as an anti-theft device comprising a first and a second fastening devices having, respectively, a first countercheck and a second countercheck both having a sphere shape, also falls within the protection scope.

Furthermore, also an embodiment wherein said pin 2b is not realized in a single piece with said countercheck 2a, but is realized apart and distinct from said countercheck element, and however coupleable to the same, still falls within the protection scope of the present invention.

The anti-theft device 1 comprises, as well, means 4 for not-removably constraining said first fastening element 2 to said second fastening element 3. Thus, in practice, when positioned on the saddle 100, the device 1 crosses the through hole 101 and remains fastened, without being removable, on the saddle between the two outer surfaces 102a, 102b of the lining layer 102. In the case herein described, only said first fastening element 2 is housable, at least partially, inside said through hole 101, since the pin 2b completely crosses the hole 101, however in other embodiments also the second fastening element 3 could be provided with a pin that is, partially, housed inside the hole 101 and, due to constraining means 4, remains firmly connected to said first fastening element 2.

Always according to the herein described embodiment, the anti-theft device 1 comprises a protecting annular ring 11 disposed in abutment between one of the outer surfaces 102b of said saddle 100 and said second fastening element 3. In particular, the second countercheck element 3a remains housed, at least partially, inside said protecting annular ring 10, outside said through hole 101.

It has to be observed that said protecting ring 11 has a truncated-cone shape and that, preferably, the outer surface 11a of said protecting ring is substantially tangent to the outer surface 3d of said second countercheck 3a, at least when it is housed, at least partially, inside said protecting ring 11. Such a solution results in a lot of technical advantages. First of all the protecting annular ring 11 hides the free end portion 2c of said pin 2b. In this way, the pin 2b can not be cut at the portion that could possibly remain freely visible, when the anti-theft device 1 is prearranged on the saddle 100. Secondly, such an annular ring 11, just due to the fact of being truncated-cone in shape and since the tilt of its outer surface 11a is tangent to the spherical surface 3d of the second countercheck 3a, it becomes extremely difficult to grip forcefully. This prevents anyone from easily removing the anti-theft device 1, or without damaging the saddle 100.

Always according to a herein described embodiment, said constraining means 4 comprise a plurality of annular guides 50 having a truncated-cone shape jutting from the outer side surface 2d of said pin 2b and coupleable by interference with the inner side surface 3c of said blind hole 3b. Such a solution is advantageously employed also for facilitating the shearing of the pin 2b in case it is too long with respect to the thickness of the saddle 100. In fact, between two consecutive annular guides 50 the thickness of the pin 2b is reduced and, thus, it can be more easily sheared.

Figure 5:
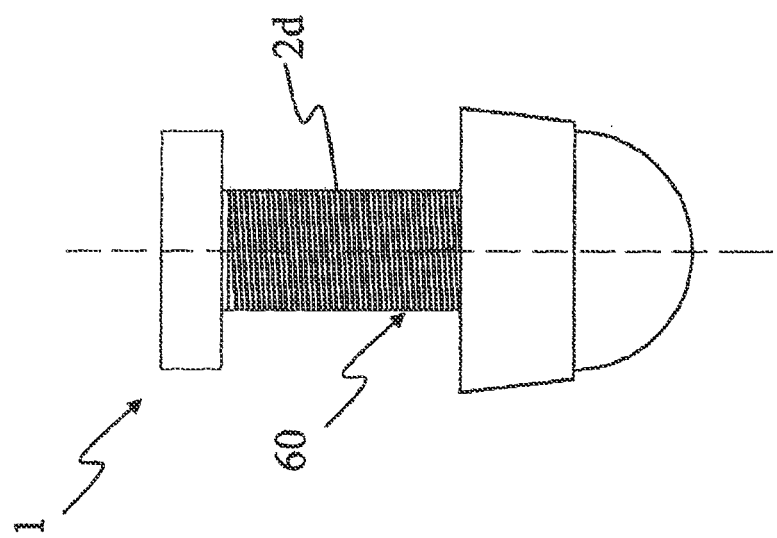
FIG. 5 is a view of an anti-theft device in accordance with a further embodiment of the invention.

According to a further embodiment of the invention represented in FIG. 5, said constraining means 4 comprise first threaded elements 60 obtained on the outer side surface 2d of said pin 2b and second threaded elements (herein not shown) obtained on the inner side surface 3c of said blind hole 3b, screwed with extreme force to said first threaded elements 60.

Again, according to a herein hot shown embodiment, said constraining means 4 comprise an outer cylindrical surface obtained on the outer side surface 2d of said pin 2b and an inner cylindrical surface obtained on the inner cylindrical surface 3c of said blind hole 3b and coupleable by interference between the portions with said outer cylindrical surface.

Note that the constraining means 4 could also comprise glue or other similar means, still falling within the protection scope of the present invention.

Figure 6:
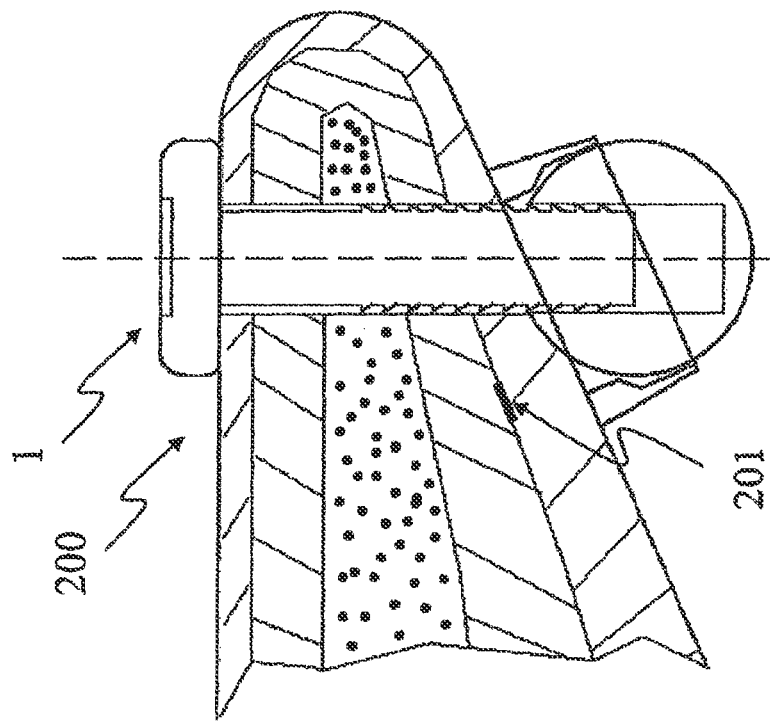
FIG. 6 is a view of an anti-theft system according to the invention.

According to the embodiment herein described and depicted in FIG. 6, an anti-theft device 200 is proposed comprising the anti-theft device 1 and a RFID device 201 insertable into said saddle 100, through said through hole 101, and which can be positioned between said outer lining layer 102, in leather, or hide, and said intermediate layer 103, in foam rubber, of said saddle 100. In his way, it is possible to immediately trace the saddle owner by simply reading the content of the information stored in the RFID device, such as for example an alphanumeric code, without removing the anti-theft device 1. Such an alphanumeric code can be associated with the owner name in case he is registered in an external database. In this way, without damaging the saddle, the owner can be traced and the stolen saddle can be given him back. Note that, although in the specific case a saddle 100 is shown consisting of three layers 102, 103, 104, however a saddle realized with more layers or fewer layers, or at worst in a single layer, or differently arranged layers, for example as shown in the following FIGS. 7 and 8, still falls within the protection scope of the present invention.

Always according to the invention, the method for prearranging an anti-theft device 1 as above described, comprises the step of realizing a through hole 101 on said saddle 100, i.e. on the three layers 102, 103, 104 which—according to the herein described embodiment—compose it, and the step of not-removably constraining said first fastening element 2 to said second fastening element 3 at said through hole 101, by said constraining means 4. Such a through hole 101 is preferably realized at the cantle of the saddle 100. The position of the cantle of the saddle 100 is known to the field technician and can be detected, more specifically, at the end of the core 104, or saddle-bow, of the saddle 100. However it is clear that a through hole 101 realized in another point of the saddle-bow, or core or frame of the saddle 100, including the front saddle-bow and/or at the quarter of the saddle 100, portion consisting of one or more layers, one of padding and one or more of hide, still falls within the protection scope of the present invention.

Furthermore, a method for prearranging an anti-theft system 200 for saddle is provided comprising, as explained above, the anti-theft device 1 and a RFID device 201. Such a method comprises the step of realizing a through hole 101 on said saddle 100, the step of inserting said RFID device 201 through said through hole 101, between said intermediate layer 103 and said outer layer 102, and the step of not-removably constraining said first fastening element 2 to said second fastening element 3 at said through hole 101, preferably realized at the cantle of the saddle 100. Note that, for what said above referring to the layers composing the saddle 100, it is evident that also a method in which the above mentioned RFID device 201 is inserted between layers different from those indicated, or is generically inserted into the saddle 100 itself, falls within the protection scope of the present invention. Note that such a RFID device could be replaced also by a GPS device, without thereby departing from the protection scope of the present invention.

The anti-theft device 1 depicted in FIG. 7 can be advantageously used in case of inserting the device 1 into a saddle 100 during the realization of the latter, so that to hide to the user view, either only said first countercheck element 2, or only said second countercheck element 3, or both said first and said second countercheck element 2 and 3. This, of course, allows completely preserving the original aesthetics of the saddle while providing it, however, with the peculiarities of the anti-theft device 1 object of the invention, i.e. the fact of making impossible removing such a device from the saddle without damaging the saddle itself, with the consequence of rendering it unusable or, however, immediately accounting for its shady provenience in case of removal of the device itself.

The saddle 100, as said above, comprises three layers 102, 103, 104 of which a first layer 104 and a second layer 102 having, respectively, a through hole 101a and a second through hole 101b. The device 1 comprises, as already explained above, a first fastening element 2 and a second fastening element 3 provided, respectively, with a first countercheck 2a and a second countercheck 3a, respectively, directly and indirectly coupleable in abutment, from opposite sides of said through holes 101a and 101b, to the outer surfaces 104b and 104a of the said first pierced layer 104 of said saddle 100.

Furthermore, said first fastening element 2 is housable, at least partially, inside said through hole 101a and said second through hole 101b. Again, the anti-theft device 1 comprises, as well, means 4 for not-removably constraining said first fastening element 2 to said second fastening element 3. According to the embodiment described in FIG. 7, the first countercheck 2a has a substantially half-sphere shape, whereas the second countercheck 3a has a lowered plate shape. Furthermore, the first fastening element 2 is provided with a pin 2b housable, at least partially, both in the through hole 101a and in the second through hole 101b, whereas the second fastening element 3 comprises a blind hole 3b to accommodate the free end portion 2c of the pin 2b.

Again, the device 1 also comprises a protecting annular ring 11, having a cylinder shape, which is disposed in abutment between one of the outer surfaces 102b of said saddle 100 and said second fastening element 3, wherein the second countercheck element 3a is housable inside said protecting annular ring 11 so that to result flush with the latter.

According to the embodiment described in FIG. 7, the constraining means comprise first threaded members 60 obtained on the outer side surface of the pin 2b and second threaded members obtained on the inner side surface of the blind hole 3b and screwable to said first threaded members. According to the invention, some glue is prearranged between said first threaded elements 60 and said second threaded elements.

In the embodiment of FIG. 8, with respect to the embodiment described in FIG. 7, the device 1 further comprises GPS localizing means 300, where GPS is the English acronym for Global Positioning System. Such GPS localizing means 200 are provided with a supporting frame 301 having a passage eyelet 302 and which can be positioned between said second countercheck 3a and one of the two surfaces 104a of said first pierced layer 104 of said saddle 100, in such a way that the pin 2b of said second fastening element 2 is housable inside said passage eyelet 302 of said frame 301. Note that, in the specific case, the supporting frame 301 is positioned contacting said second countercheck 3a directly and contacting one surface 104a of the two surfaces 104a, 104b of said first pierced layer 104 indirectly. In practice, in the embodiment of FIG. 8, such a frame 301 is contacted with the outer surface 102b of the saddle 100.

In accordance with an embodiment herein not shown, said first countercheck 2a, or alternatively said second countercheck 3a too, comprises the supporting frame 301 for said GPS localizing means 300. In practice the countercheck element 2a, or 3a itself, is the frame 301 for said GPS localizing means. Such a supporting frame 301 is advantageously made of metallic material. The GPS controlling unit, the batteries for power supplying the GPS controlling unit and a shell made of plastic, or other material which however allows the communication with the outside of the GPS for protecting the GPS controlling unit and the batteries, are attached thereon. In general, the GPS controlling unit is known to the field technician and, thus, not further detailed herein.

It has to be noted that the GPS localizing means 300 allow exactly locating the position of the saddle, instant by instant.

Always according to the invention, hereinafter the method is described for prearranging an anti-theft device 1 for saddle according to the embodiments described in FIGS. 7 and 8. According to a first embodiment, the method comprises the step of a) making a through hole 101a on said first layer 104 of said saddle 100 having one or more layers 102, 103, 104, the step of b) housing said first fastening element 2, but particularly said pin 2b of said first fastening element 2, inside said through hole 101a, in such a way that said first countercheck 2a is directly coupleable in abutment to one 104b of the outer surfaces 104a, 104b of said first pierced layer 104, and the step of c) constraining in a not-removable way said first fastening element 2 to said second fastening element 3, by said constraining means 4. Before the step c), the further step is comprised of d) lining, at least partially, said first pierced layer 104 with additional layers 102, 103 so that to directly cover said first countercheck 2a. In addition, always before the step c) of the method, the step is comprised of e) realizing a second through hole 101b on said second layer 102 of said additional layers 102, 103, and the step of f) housing said second fastening element, but in particular said pin 2b of said first fastening element 2, inside said second through hole 101b of said second layer 102.

In practice, due to such a solution, the second countercheck 3a remains visible to the user on the lower outer surface 102b of the saddle 100, whereas the first countercheck element 2 remains inside the finished saddle 100, thus hidden to the user's eyes.

Note that, although herein a solution is described in which the possibility is provided, during the step e), of realizing a second through hole 101b on said second layer 102 of said additional layers 102, 103, however a different solution, herein not shown, wherein the possibility is provided of realizing a third through hole on the additional layer 103, so that said pin 2b of said second fastening element 2 is housable also inside said third through hole 101b of said additional layer 103, still falls within the protection scope of the present invention.

Finally, in accordance with the embodiment described in FIG. 8, said step c) is preceded by the step of g) positioning said frame 301 of said GPS localizing means between said second countercheck 3a and one 104a of the surfaces 104a, 104b of said first pierced layer 104 of said saddle 100, in such a way that said first fastening element 2, but in particular said pin 2b of said first fastening element 2, is housable inside said passage eyelet 302 of said frame 301. The GPS localizing means are thus not-removably blocked to the saddle 100, unless cutting the saddle portion accommodating the anti-theft device 100.

It has to be specified that in accordance with a further embodiment herein not shown, the GPS localizing means 300 are adapted also to be coupled to the anti-theft device 1 according to a method providing the presence of a single through hole 101 for the saddle 100, therefore passing through all layers 102, 103, 104 composing the same. In this case, both the first countercheck 2a and the second countercheck 3a are visible from the outside of the saddle 100, as well as the GPS localizing means 300 themselves.

The invention claimed is:

1. Anti-theft device for a saddle having one or more layers, said saddle being adapted with at least one through hole piercing at least one first layer of said saddle, or being adapted with at least one through hole piercing through said saddle, said device comprising:
at least one first fastening member and at least one second fastening member, respectively, provided with a first countercheck and a second countercheck, directly or indirectly, coupleable in abutment, from opposite sides either of said at least one through hole piercing said at least one first layer of said saddle, or of said at least one through hole piercing through said saddle and,
wherein said at least one first fastening member or said at least one second fastening member are housable, at least partially, inside said at least one through hole piercing said at least one first layer, or inside said at least one through hole piercing through said saddle,
said anti-theft device further comprising constraining means for constraining in a not-removable way said at least one first fastening member to said at least one second fastening member,
wherein said at least one first countercheck or said at least one second countercheck has a plate shape,
wherein, when the anti-theft device is mounted on the saddle, said at least one first countercheck has a half-sphere or plate shape and said at least one second countercheck has substantially a plate or sphere shape,
wherein said anti-theft device further comprises at least one protecting annular ring configured to be disposed in abutment between an outer surface of said saddle and said at least one second fastening member,
wherein said at least one second countercheck member is housable, at least partially, inside said at least one protecting ring, when said at least one protecting annular ring is in abutment between said outer surface of said saddle and said at least one second fastening member whereby said at least one second countercheck member is disposed either outside of said through hole piercing said at least one first layer of said saddle, or outside of said at least one through hole piercing through said saddle, and
wherein said at least one first fastening member is provided with a pin housable, at least partially, inside said at least one through hole piercing said at least one first layer, or inside said at least one through hole piercing said saddle, and wherein said at least one second fastening member is adapted with at least one blind hole to accommodate a free end portion of said at least one pin.

2. The anti-theft device according to claim 1, wherein said at least one first countercheck or said at least one second countercheck has substantially a half-sphere, or sphere, shape.

3. The anti-theft device according to claim 1, wherein said at least one protecting annular ring has a cylindrical, or truncated-cone, shape.

4. The anti-theft device according to claim 3, wherein an outer side surface of said protecting annular ring has a truncated-cone shape, said outer side surface being substantially tangent to an outer surface of said at least one second countercheck, at least when said at least one second countercheck is housed, at least partially, inside said protecting annular ring.

5. The anti-theft device according to claim 1, wherein said constraining means comprise first threaded members obtained on an outer side surface of said pin and second threaded members obtained on an inner side surface of said blind hole and screwable to said first threaded members, and said constraining means further comprising an adhesive prearranged between said first threaded elements and said second threaded elements.

6. The anti-theft device according to claim 1, wherein said constraining means comprise a plurality of annular guides having a truncated-cone shape jutting from the outer side surface of said pin and coupleable by interference with the inner side surface of said blind hole.

7. The anti-theft device according to claim 1, wherein said constraining means is disposed on the outer side surface of said pin and disposed on the inner cylindrical surface of said blind hole and coupleable by interference with said outer surface of said pin.

8. The anti-theft device according to claim 1, further comprising GPS localizing means provided with a supporting frame having at least one passage eyelet and configured to be positioned, directly or indirectly, between said at least one first countercheck or said at least one second countercheck, and said outer surface of said saddle whereby said pin of said at least one first fastening element is housed inside said at least one passage eyelet of said frame.

9. The anti-theft device according to claim 8, wherein said first countercheck or said second countercheck is adapted to couple said supporting frame for said GPS localizing means.

* * * * *